May 14, 1963

H. E. EIRHART, JR 3,089,198

METHOD OF MAKING A BALL JOINT

Filed May 21, 1958

H. E. EIRHART, JR.
INVENTOR.

BY E. C. McRae
J. R. Faulkner
J. H. Oster

ATTORNEYS

United States Patent Office 3,089,198
Patented May 14, 1963

3,089,198
METHOD OF MAKING A BALL JOINT
Harry E. Eirhart, Jr., Detroit, Mich., assignor to Ford Motor Company, Dearborn, Mich., a corporation of Delaware
Filed May 21, 1958, Ser. No. 736,753
2 Claims. (Cl. 18—59)

This invention relates generally to a method of making a ball joint assembly having low friction characteristics.

It is an object of the present invention to provide a method of making a low friction ball joint assembly in which one of the cooperating ball joint members is coated with a suitable binder material, and in which a thin coating of flocked low friction fiber is applied to the surface of the binder material to provide a low friction long wearing surface for frictional engagement with the other of said ball joint members. The binder and flock are applied to one of the ball joint members prior to its assembly with the other member, and a predetermined volume is provided slightly in excess of that required to fill the cavity between the ball joint members. The two members are then assembled in operative relationship and clamped together while the binder cures, a runoff gate or opening being provided to permit the escape of excess binder. The time of curing of the binder, the volume of excess binder, and the size of the opening are controlled in relation to each other in such manner as to provide a predetermined preload between the ball joint members when the binder material is cured.

Another object of the invention is to provide a method of making a low friction ball joint assembly using relatively inexpensive materials and operations, and lending itself to automation processing.

Other objects and advantages of this invention will be made more apparent as this description proceeds, particularly in connection with the accompanying drawings, in which.

Figures 1, 2:
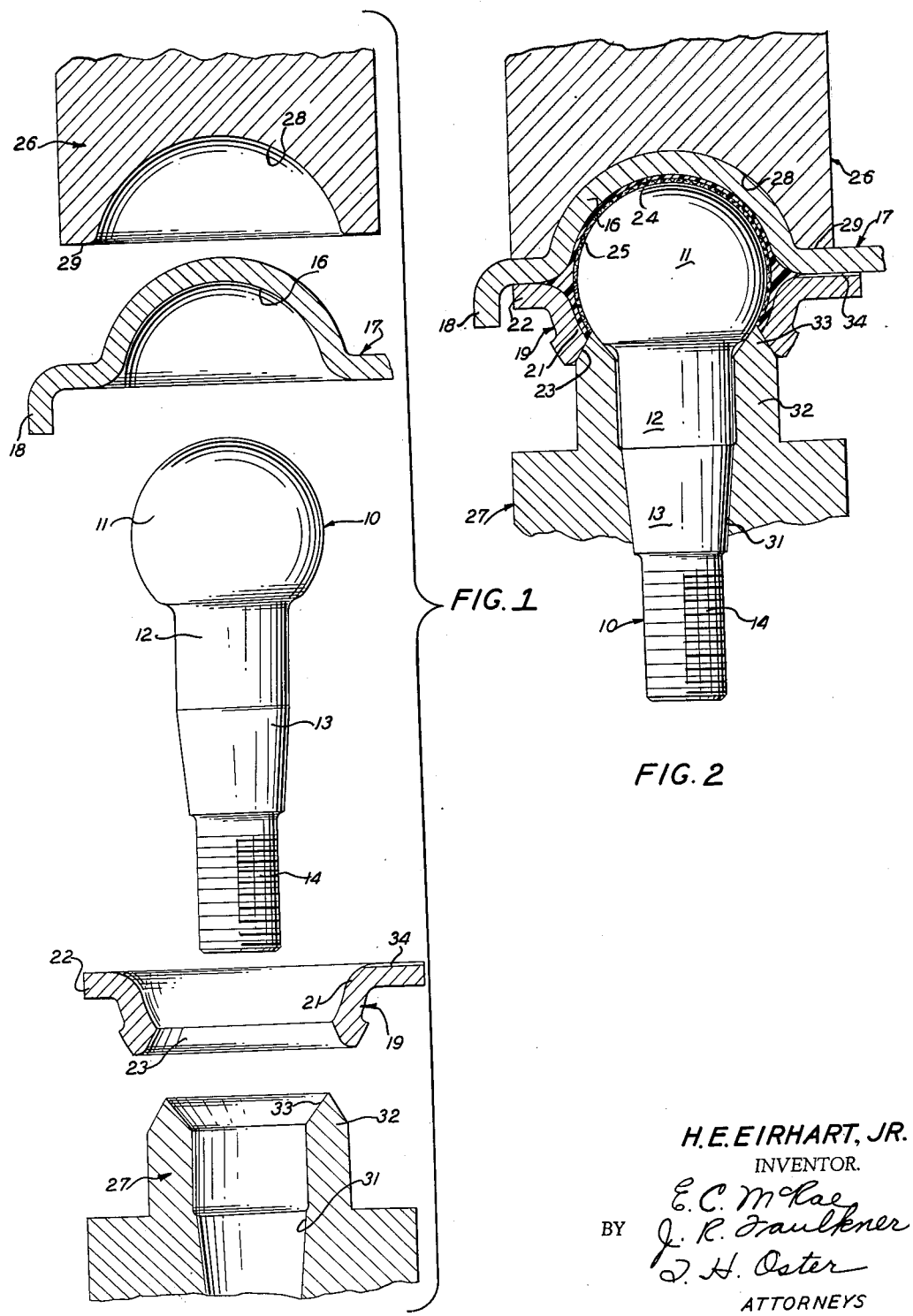
FIGURE 1 is an exploded cross sectional view illustrating the parts of the ball joint and the assembly fixtures used in carrying out the present invention.
FIGURE 2 is an assembled cross sectional view of the ball joint assembly and assembly fixtures during the final portion of the method of manufacture.

Referring now particularly to FIGURE 1, the ball joint assembly includes a ball stud 10 having a spherical end 11, a cylindrical shank 12, a tapered shank 13 and a threaded end 14. The spherical end 11 of the ball stud is adapted to be received within a semispherical socket 16 formed in an upper ball retainer 17. The upper ball retainer 17 may be a suspension arm for the front wheel suspension of a motor vehicle. A marginal reinforced flange 18 is formed at the outer end of the ball retainer or suspension arm 17.

Cooperating with the upper ball retainer 17 is a lower ball retainer 19 having a semispherical socket 21 formed therein and having a marginal flange 22 adapted to be seated against the flange of the upper ball retainer 17. An enlarged opening 23 is formed in the lower portion of the lower ball retainer 19 to provide clearance for the shank 12 of the ball stud.

The upper and lower ball retainers 17 and 19 are stamped from sheet metal while the spherical end 11 of the ball stud 10 is machined to provide a smooth bearing surface. The semispherical sockets 16 and 21 in the ball retainers have a diameter slightly larger than the diameter of spherical end 11 of the ball stud to provide a cavity therebetween.

During manufacture the interior surfaces of the sockets 16 and 21 of the upper and lower ball retainers 17 and 19 are sprayed, brushed, or otherwise coated with a phenolic, epoxy or other suitable resin binder 24. If desired, other appropriate binder material may be used, such as a metal adhesive, and the material may be of the thermosetting type or adapted to be cured by chemical reaction.

A coating 25 of low friction flocked fiber, such as tetrafluoroethylene flock, is applied to the surface of the coating 24 of binder material to form a low friction bearing surface for engagement with the spherical end 11 of the ball stud. The tetrafluoroethylene flock may be applied to the coating of binder material by electrostatic deposition, or a high frequency excitation of the parts in an atmosphere of flocked material. A predetermined amount of binder and flocked fiber is deposited on the upper and lower ball retainers with the volume being somewhat in excess of the amount required to fill the cavity between the ball stud and the ball retainers.

The coated upper and lower ball retainers 17 and 19 are then assembled over the spherical end 11 of the ball stud 10 with the adjacent flanges of the ball retainers in juxtaposition, and the assembly is clamped together while the binder cures. This is accomplished by means of upper and lower assembly fixtures 26 and 27. The upper assembly fixture 26 has a central semispherical socket 28 engaging the semispherical portion 16 of the upper ball retainer 17. The annular marginal flange 29 bears against the flange of the upper ball retainer 17 to form a support therefor.

The lower assembly fixture 27 has a tapered hole 31 receiving the tapered shank 13 of the ball stud 10 and supporting and locating the latter. The lower fixture also has an annular hub 32 surrounding the cylindrical shank 12 of the ball stud and providing a slight clearance therebetween. The upper end of the hub 32 has a truncated marginal portion 33 fitting within the opening 23 in the lower ball retainer 19, and also engaging the spherical end 11 of the ball stud to prevent the escape of binder and fiber through the opening 23 during the clamping and curing process.

The flange 22 of the lower ball retainer 19 is provided with an opening or groove 34 along its upper surface forming a gate for the runoff of excess binder. By properly restricting the size of the groove 34 in relation to the amount of excess binder material and the time of the curing of the material, the binder material 24 will cure with a predetermined preload being established between the flocked surface 25 and the ball stud. A ball joint having low static and dynamic friction characteristics as well as long life is thus provided.

If desired, the coating of binder material and flocked fiber may be applied to the exterior surface of the ball stud rather than to the interior surface of the ball retainers, with the method of manufacture being otherwise the same as that described above.

It will be understood that the invention is not to be limited to the exact construction shown and described, but that various changes and modifications may be made without departing from the spirit and scope of the invention, as defined in the appended claims.

What is claimed is.

1. The method of making a ball joint having a ball member and a ball retaining member of such relative size as to form a relatively thin cavity therebetween, comprising the steps of applying a coating of binder material of predetermined volume to the surface of one of said members, applying a coating of flocked low friction fiber upon the surface of said coating of binder material, one of said members having an opening therein communicating with said cavity, assembling said members together and clamping them in assembled relationship while said binder material cures, the said predetermined volume of binder material being in excess of the amount required to fill the cavity between said members, and escaping in part through said opening, and controlling the time of curing said binder material in relation to the size of said opening and the excess volume of binder material to provide a predetermined preload in the binder material when the material is cured.

2. The method of making a low friction ball joint comprising the steps of applying a coating of binder material of predetermined volume to the interior spherical surfaces of a pair of complementary ball retaining members, said ball retaining members having mating flanges and one of said ball retaining members having a restricted opening therein communicating with the interior spherical surface of said member, depositing a coating of flocked low friction fiber upon the surface of said coating of binder material, assembling said coated and flocked retaining members around the exterior spherical surface of a ball member with the flanges of the retaining members in juxtaposition, and clamping said retaining members and ball member in assembled relationship while said binder material cures, the said predetermined volume of binder material being in excess of the amount required to fill the cavity between the ball and retainer members and escaping in part through said opening, and controlling the time of curing of the binder material in relation to the size of said opening to provide a predetermined preload in the binder material when the material is cured.

References Cited in the file of this patent

UNITED STATES PATENTS

| | | |
|---|---|---|
| 941,032 | McCarthy | Nov. 23, 1909 |
| 1,943,631 | Skillman | Jan. 16, 1934 |
| 1,867,540 | Rosenberg | July 12, 1937 |
| 2,227,969 | Haushalter | Jan. 7, 1941 |
| 2,457,156 | Jones | Dec. 28, 1948 |
| 2,715,766 | Rickes | Aug. 23, 1955 |
| 2,835,521 | White | May 20, 1958 |
| 2,838,436 | Clingman | June 10, 1958 |
| 2,885,248 | White | May 5, 1959 |
| 2,890,041 | Runton et al. | June 9, 1959 |

FOREIGN PATENTS

| | | |
|---|---|---|
| 355,616 | Great Britain | Aug. 27, 1931 |